United States Patent [19]
Savicki

[11] Patent Number: 5,359,189
[45] Date of Patent: Oct. 25, 1994

[54] INFRARED COLLECTOR HAVING A FLATTENED CONVEX SURFACE

[75] Inventor: Joseph P. Savicki, Clinton, N.J.

[73] Assignee: AT&T Bell Laboratories, Murray Hill, N.J.

[21] Appl. No.: 37,860

[22] Filed: Mar. 29, 1993

[51] Int. Cl.$^5$ ............................................. H01J 3/14
[52] U.S. Cl. .................................. 250/216; 250/338.1
[58] Field of Search ................... 250/216, 338.1, 353, 250/342, 344; 257/432, 442, 466; 359/831–837

[56] References Cited

U.S. PATENT DOCUMENTS

| | | |
|---|---|---|
| 4,636,631 | 1/1987 | Carpentier et al. ................. 250/216 |
| 4,787,082 | 11/1988 | Delaney et al. ..................... 370/85 |
| 5,022,725 | 6/1991 | Matsunami et al. ................. 250/216 |
| 5,258,609 | 11/1993 | Holmes ................................ 250/216 |

OTHER PUBLICATIONS

F. R. Gfeller, et al., "Wireless In–House Data Communication via Diffuse Infrared Radiation", Proceedings of the IEEE, vol. 67, No. 11, Nov. 1979 pp. 1474–1486.
G. Smedstad, et al., "The Thermodynamic Limits of Light Concentrators", Solar Energy Materials, 21 Jan. (1990) 99–111, North Holland.

Primary Examiner—David C. Nelms
Assistant Examiner—Que T. Le
Attorney, Agent, or Firm—Gordon & Nelson

[57] ABSTRACT

An infrared collector which employs a non-directive concentrator to concentrate the infrared radiation received in the collector on a detector. In a preferred embodiment, the concentrator is a plastic hemisphere which has an array of PIN diodes glued to its flat side. The hemisphere may have any radius which is greater than or equal to a value dN, where N is the index of refraction of the plastic making up the hemisphere is N and d is the distance from the center of the array of diodes to the most remote part of the infrared-sensitive material. The fact that the concentrator is non-directive obviates the need to aim receivers employing the concentrator at transmitters. The receivers and transmitters need only be in line of sight of each other. The concentrator may further be used generally to concentrate infrared and visible radiation.

7 Claims, 1 Drawing Sheet

INFRARED COLLECTOR HAVING A FLATTENED CONVEX SURFACE

CROSS-REFERENCE TO RELATED APPLICATION

This application is being filed on the same day as another application entitled Digital Infrared Communications System with Edge Detection which has the same inventor and assignee as the present application and shares part of its disclosure with the present application.

BACKGROUND OF THE INVENTION

The invention relates generally to light concentrators and more particularly to collectors for infrared radiation.

FIELD OF THE INVENTION

DESCRIPTION OF THE PRIOR ART

As digital systems have grown smaller, portability has become an ever-more important consideration in their design. An important component of portability is wireless connectivity, that is, the capability of digital devices to communicate with each other without being connected by cables. Infrared radiation has long been used to achieve wireless connectivity; an example is the remote controls used with consumer electronics devices. Such remote controls work by sending infrared signals from the remote control to a receiver on the electronics device.

There have, however, been important limits on the use of infrared radiation for wireless connectivity. There have in general been two classes of devices which have used infrared radiation for wireless connectivity: directed devices such as the remote control mentioned above which must be pointed at the infrared receiver and non-directed devices, which don't have to be aimed. Prior-art non-directed devices have worked simply by outputting an infrared signal so powerful that it is powerful enough to be usable anywhere within an enclosed space containing the non-directed device.

Each of these classes of devices has its disadvantages. The directed devices are low powered, but they must be pointed. If the directed device is mobile, it must be constantly re-aimed. The non-directed devices do not need to be re-aimed, but the power required to produce their infrared signals has made it difficult to produce low-powered and therefore light-weight portable devices.

One reason for the lack of low-power non-directed devices has been the lack of any infrared collector which could concentrate infrared radiation but was relatively insensitive to the direction from which the radiation came. It is an object of the present invention to provide such an infrared collector and to further provide an improved light concentrator.

SUMMARY OF THE INVENTION

The invention is an infrared collector which includes a non-directive concentrator to concentrate the infrared radiation received by the collector. Because the collector concentrates the infrared radiation, but uses a concentrator which is not particularly sensitive to the direction of the infrared radiation, the collector is particularly well adapted for use in low-power portable systems.

While the collector may use any form of non-directive concentrator, the non-directive concentrator employed in a preferred embodiment is a solid dielectric hemisphere which is transparent to infrared radiation. The collector further includes an infrared detector whose diameter relative to the hemisphere is smaller than earlier believed possible. The relationship between hemisphere size and detector size of the preferred embodiment may be used in any system involving a solid dielectric hemisphere.

The foregoing and other objects and advantages of the invention will be apparent to one of ordinary skill in the art who peruses the following Drawing and Detailed Description, wherein:

Figure 1:
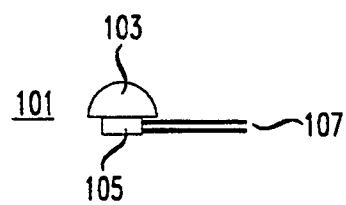
FIG. 1 is a diagram of a preferred embodiment of the collector of the invention.

The reference numbers employed in the Drawing and the Detailed Description have three or more digits. The two least significant digits are a number within a figure; the remaining digits are the figure number. Thus, the element with the reference number "105" is first shown in FIG. 1.

DETAILED DESCRIPTION

The following Detailed Description will first describe a preferred embodiment of the infrared collector and will then provide a theoretical demonstration of the reasons for its improved performance.

The Infrared Collector: FIG. 1

FIG. 1 shows a preferred embodiment of the infrared collector. Infrared collector 101 includes an infrared radiation detector 105 and a dielectric hemisphere 103. Signals detected by the collector are provided via connection 107 to the device to which the collector is attached. In the preferred embodiment, infrared radiation detector 105 consists of an array of four plastic-encased PIN diodes which have been glued together and connected in parallel. In other embodiments, other forms of infrared radiation detectors may be used, including for example, a single diode. The coupling between the detector and the hemisphere must be such that a minimal amount of light is reflected from the coupling. In a preferred embodiment, hemisphere 103 is made of transparent plastic and the diode array is glued to the flat surface. Hemisphere 103, the glue, and the plastic encasing the PIN diodes all have substantially the same optical index of refraction. In other embodiments, hemisphere 103 may be integral with the packaging of the diodes. In such an embodiment, materials with an index of refraction substantially higher than that of plastic may be employed and the concentrating effect of the hemisphere thereby increased.

In a preferred embodiment, the hemisphere may have any radius which is greater than or equal to a value determined as follows: the index of refraction of the plastic making up the hemisphere is N; the distance d is the distance from the center of the array of diodes to the most remote part of the infrared-sensitive material; the minimum radius of the hemisphere is then dN. The fact that only a minimum radius of the hemisphere is determined by the size of the infrared detector simplifies fabrication of the collector and further permits the size of the hemisphere to be altered to diminish the loss of light due to reflection.

The degree of concentration provided by the hemisphere is substantially independent of its radius and approaches $N^2$; thus, in the preferred embodiment, where the plastic used in the hemisphere has an index of refraction of substantially $\sqrt{2}$, the degree of concentration is 2.

Hemisphere 103 may further be replaced by any transparent dielectric solid such that: that:

The solid is convex above a base plane determined by the top surface of the detector; and any ray which connects any part of the top surface of the sensor to any part of the solid above the base plane intersects the surface of the solid at an an angle less than the critical angle for the material.

Figure 4:
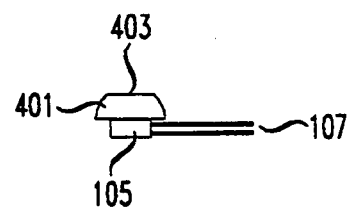
FIG. 4 is a diagram of an embodiment of the collector which has been modified to selectively concentrate infrared radiation.

Moreover, the convex shape may be formed such that signals from certain areas of the half space are concentrated more than signals from other areas of the half space. For example, the concentrator for a collector used in an indoor environment may be modified such that it preferentially concentrates light from areas other than directly above the concentrator, and may thus act to diminish the response of detector 105 to light from the interior lighting. One such modification is to simply flatten the top of hemisphere 103. FIG. 4 shows such a modified hemisphere 401. Vertical light which strikes flat surface 403 will not be concentrated by modified hemisphere 401, while other light striking modified hemisphere 401 will be. Consequently, the response of detector 105 to light from the interior lighting will be substantially diminished.

A special characteristic of hemisphere 103 is that it is a non-directive concentrator; consequently, the infrared radiation which it concentrates may come from any point in the half-space above the hemisphere. That being the case, collectors using hemisphere 103 are effective with both systems using line-of-sight communications and systems using diffuse communications. Collectors based on the same principles as collector 101 may be constructed using any kind of non-directive concentrator; a hemispheric non-directive concentrator is however particularly advantageous because it is easily made and couples well to flat diodes. Another type of non-directive concentrator which can be easily coupled to flat surfaces is the dielectric-filled compound parabolic concentrator. For a discussion of non-directive concentrators generally, see Smestad, G., et al., "The Thermodynamic Limits of Light Concentrators," *Sol. Energy Mater.*, vol. 21, no. 2-3, pp. 99–111, 1990.

Theory of the Concentrator

Hemisphere 103 (or any other shape meeting the conditions described above) operates to concentrate line of sight signals because detector 105 is at the center of the base plane and the convex shape above the base plane diverts all rays from the transmitter in a direction such that they strike the base plane closer to its center than they would if they had not passed through the solid. In the case where the hemisphere is much larger than the sensor and the signal source is very far away, the concentration approaches $N^2$.

Figure 2:
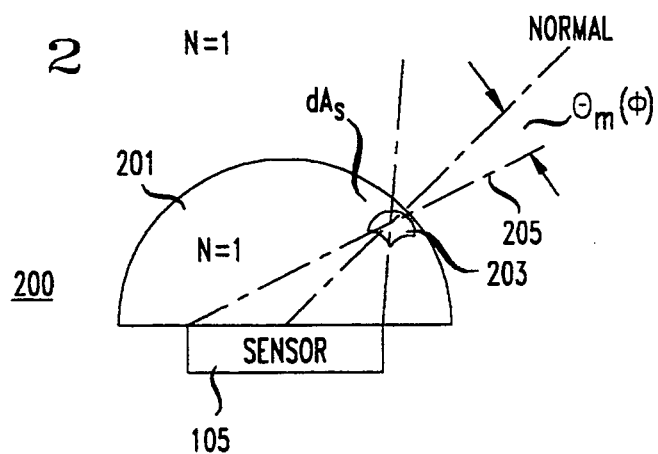
FIG. 2 is a diagram of an ideal hemisphere which does not bend the light passing into i
Figure 3:
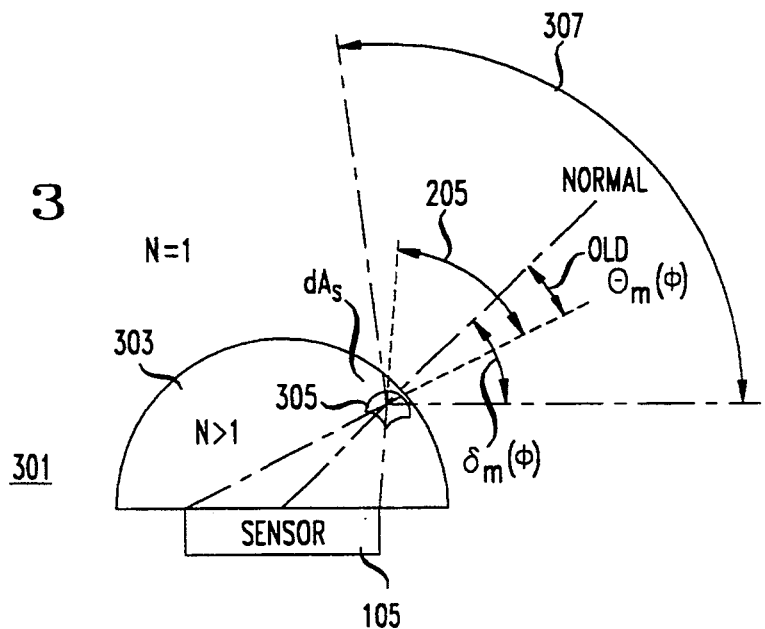
FIG. 3 is a diagram of a hemisphere which does bend the light passing into it.

How hemisphere 103 and its analogues operate to concentrate diffuse signals can be understood from FIGS. 2 and 3. FIG. 2 shows a system 200 in which hemisphere 201 has the same refractive index as the medium through which the signals are moving. At the surface of hemisphere 201 is surface element 203. Lines from the boundaries of sensor 105 which follow the paths of rays of light as they pass through surface element 203 define a shape 205. Any light ray which strikes the surface element and is within shape 205 will reach sensor 105. FIG. 3 shows a system 301 in which hemisphere 303 has a refractive index which is higher than that of the medium through which the signals are moving. When lines are drawn as before, they follow paths determined by the refractive index of the material making up hemisphere 303 to make shape 307. The dotted lines show shape 205. As is apparent from FIG. 3, shape 307 completely contains shape 205, and the concentration of light by hemisphere 303 is a function of the difference in size between shape 205 and shape 307.

The fact that the concentration in the case of diffuse signals is $N^2$ can be derived mathematically as follows: Referring again to FIG. 2, $\theta_m(\phi)$ represents the generalized field of view of an infinitesimal surface element $dA_s$ (203) on hemisphere 201 which couples external radiation to sensor 105. The incremental power passing through infinitesimal surface element 203 which also strikes sensor 105 is $$dP_s = \int_0^{2\pi} d\phi \int_0^{\theta_m(\phi)} d\theta \sin(\theta) \left[ \frac{w}{\pi} \cos(\theta) \right] dA_s. \quad (1)$$

where $w$ is a constant representing the intensity of the diffuse radiation. The evaluation of this integral, in general, is very complex and will not be attempted here.

Continuing with FIG. 3, if hemisphere 201 is replaced with hemisphere 303 of index N, refraction at the hemisphere surface changes the generalized field of view from $\theta_m(\phi)$ to $\delta_m(\phi)$. The new incremental power, $dP_s^c$, coupled to the sensor by this concentrator through hemispherical surface element $dA_s$ (305) is $$dP_s^c = \int_0^{2\pi} d\phi \int_0^{\delta_m(\phi)} d\delta \sin(\delta) \left[ \frac{w}{\pi} \cos(\delta) \right] dA_s \quad (2)$$

where $\delta_m(\phi)$ is related to the $\theta_m(\phi)$ of equation 1 through Snell's Law of refraction. Thus, $$\sin[\delta_m(\phi)] = N\sin[\theta_m(\phi)] \quad (3)$$

so long as $\theta_m(\phi)$ is below the critical angle for total internal reflection in a material of index N.

Under this critical angle constraint, a variable transformation from $\delta$ to a new variable $\Psi$ according to $$\sin(\delta) = N\sin(\Psi), \quad (d\delta\cos(\delta) = Nd\Psi\cos(\Psi)) \quad (4)$$

is allowed. The old limit of integration, $\delta_m(\phi)$, changes to $\Psi_m(\phi)$, where $\Psi_m(\phi)$ is identically equal to the $\theta_m(\phi)$ of Equation 1. Thus, the incremental power coupled to the sensor becomes $$dP_s^c = N^2 \int_0^{2\pi} d\phi \int_0^{\theta_m(\phi)} d\psi \sin(\psi) \left[ \frac{w}{\pi} \cos(\psi) \right] dA_s \quad (5)$$

and all reference to $\Psi$ will vanish if the integration is performed. Comparison of Equation 5 with Equation 1 yields $$dP_s{}^c = N^2 dP_s \qquad (6)$$

for all elements $dA_s$ on hemisphere 303. This indicates that the hemisphere will function as an $N^2$ concentrator for diffuse radiation so long as the critical angle constraint is met.

Conclusion

The foregoing Detailed Description has disclosed to those of ordinary skill in the art how an infrared collector including a non-directive concentrator may be made and used in an infrared communications system. The Detailed Description has disclosed the best mode presently known to the inventor of practicing his invention; however, as is apparent from the Detailed Description, other embodiments employing the principles of the invention are possible. For example, non-directive concetators other than the hemisphere of the preferred embodiment may be employed, materials other than plastic may be used, and the infrared detector may be integral with the concentrator. Moreover, the geometry employed in the preferred embodiment is applicable to collectors for radiation in the visible portion of the spectrum. Because the embodiment disclosed herein is only one of many possible embodiments of the techniques with which the invention is concerned, the foregoing Detailed Description is to be understood as being in every respect illustrative and exemplary, but not restrictive. The scope of the invention disclosed herein is therefore not to be determined from the Detailed Description, but rather from the attached claims, which are to be given the broadest interpretation to which they are entitled under the law.

What is claimed is:

1. A collector for receiving infrared communications signals comprising:
   a non-directive concentrator for receiving and concentrating signals including infrared communications signals, the concentrator having a flattened convex surface which is substantially transparent to infrared radiation; and
   infrared radiation detection means for receiving the concentrated infrared communications signals from the concentrator.

2. The collector set forth in claim 1 wherein:
   the concentrator receives signals from a half space defined by a base plane of the concentrator; and
   the surface is flattened parallel to the base plane.

3. The collector set forth in claim 1 wherein:
   the concentrator is made of a light-transmitting dielectric material;
   the infrared radiation detection means is coupled to a base plane of the concentrator and the flattened convex surface is flattened with regard to the base plane; and
   the flattened convex surface is such that any line which connects any part of the infrared radiation detection means to the surface of the convex shape intersects the surface of the concentrator at an angle less than the critical angle for the material.

4. The collector set forth in claim 3 wherein:
   the smallest distance in the base plane from the base plane's center to the convex surface is greater than $$Nd$$

where N is the index of refraction of the material and d is the longest distance on the base plane from the center of the base plane to a boundary of the infrared detection means.

5. The collector set forth in claim 3 wherein:
   the flattened convex surface includes a plane which is parallel to the base plane.

6. The collector set forth in claim 1 wherein:
   the infrared radiation detection means is encased in first material which is transparent to infrared radiation; and
   the material of the non-directive concentrator is the first material or other material which has substantially the same index of refraction as the first material.

7. The collector set forth in claim 6 wherein:
   the material of the non-directive concentrator is integral with the first material.

\* \* \* \* \*

UNITED STATES PATENT AND TRADEMARK OFFICE
CERTIFICATE OF CORRECTION

PATENT NO. : 5,359,189
DATED : October 25, 1994
INVENTOR(S) : Joseph P. Savicki

It is certified that error appears in the above-indentified patent and that said Letters Patent is hereby corrected as shown below:

On the title page, under "Attorney, Agent, or Firm, change "Gordon & Nelson" to --Gordon E. Nelson--.

Signed and Sealed this

Fifteenth Day of August, 1995

Attest:

BRUCE LEHMAN

Attesting Officer *Commissioner of Patents and Trademarks*